Nov. 15, 1949  L. C. KAHLE  2,488,126
ASSEMBLING MACHINE
Filed Jan. 20, 1943  3 Sheets-Sheet 2
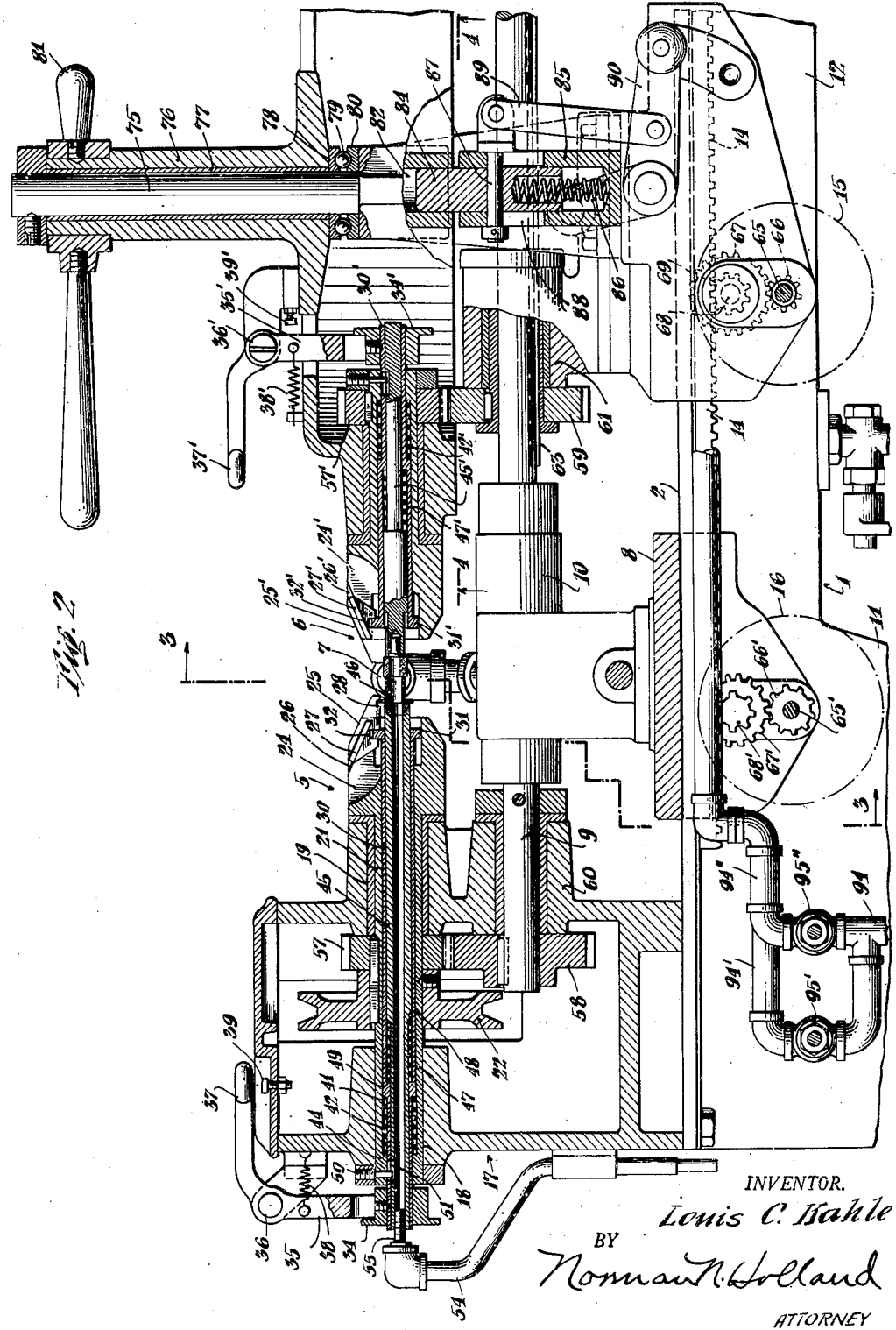
INVENTOR.
Louis C. Kahle
BY
Norman N. Holland
ATTORNEY Nov. 15, 1949     L. C. KAHLE     2,488,126
ASSEMBLING MACHINE
Filed Jan. 20, 1943     3 Sheets-Sheet 3
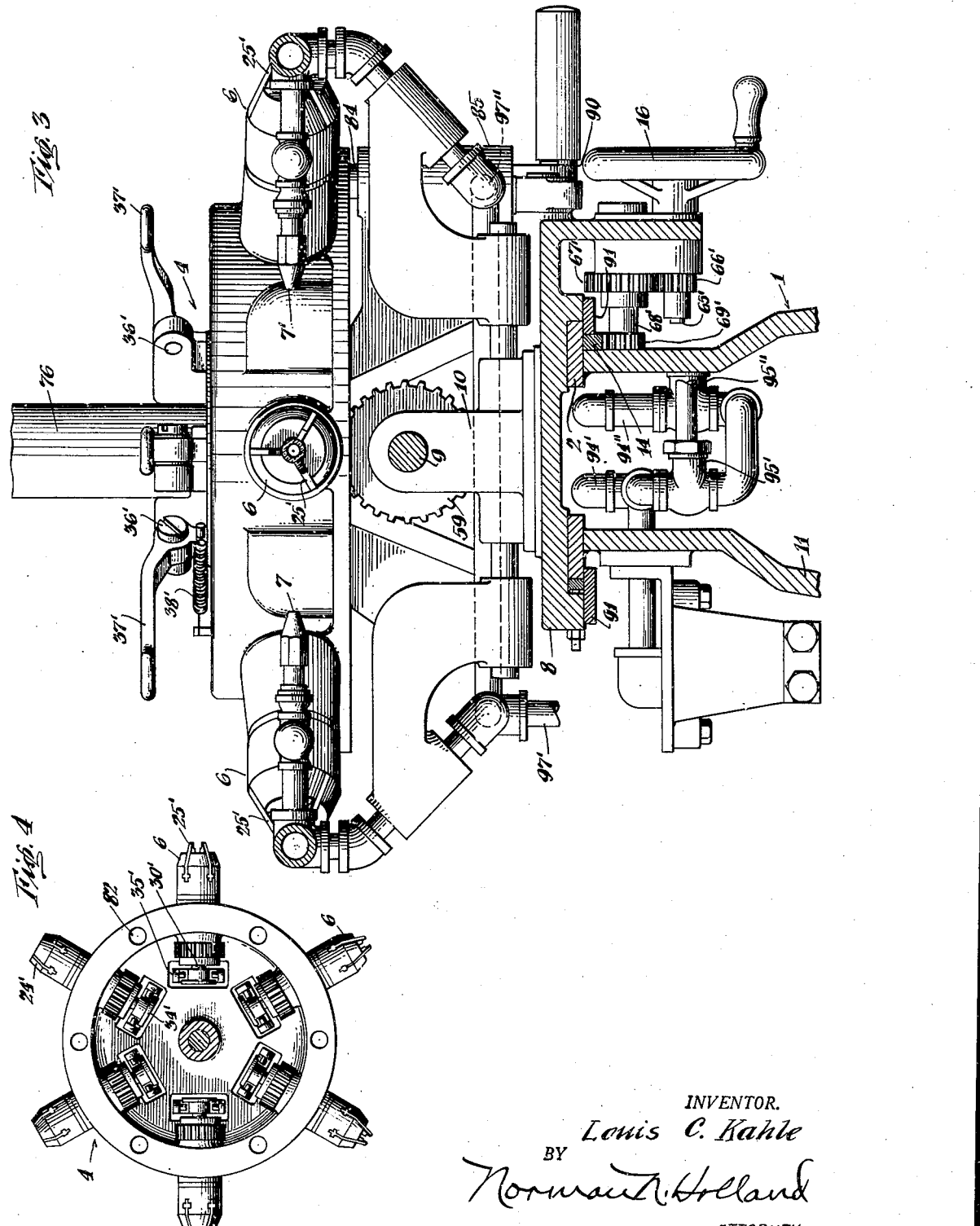
INVENTOR.
Louis C. Kahle
BY
Norman N. Holland
ATTORNEY Patented Nov. 15, 1949

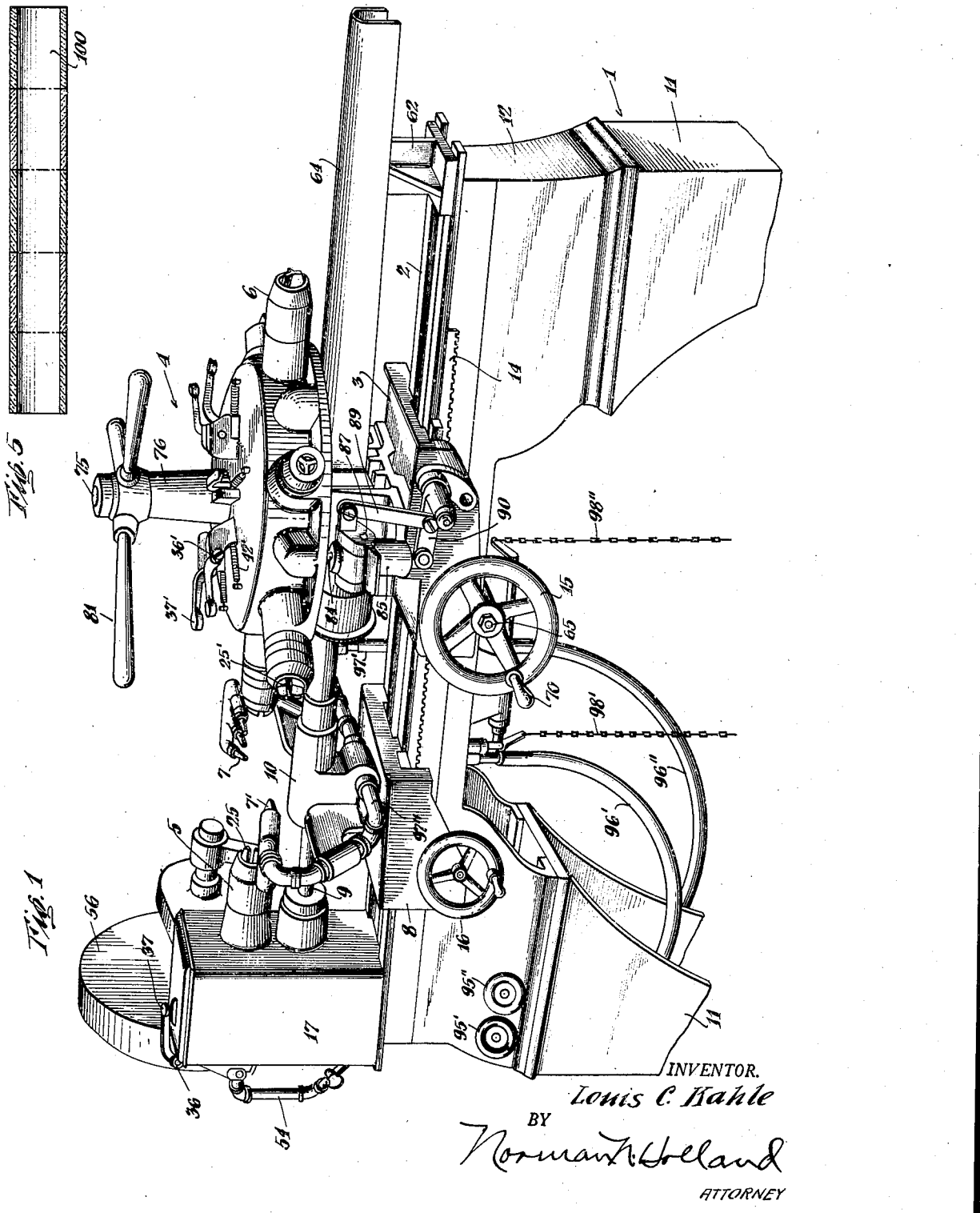

2,488,126

UNITED STATES PATENT OFFICE 2,488,126

ASSEMBLING MACHINE

Louis C. Kahle, Teaneck, N. J., assignor to Kahle Engineering Company, North Bergen, N. J., a copartnership composed of Louis C. Kahle, Jacob Hohenstein, Anna C. Richards, and Ruth N. Hohenstein Application January 20, 1943, Serial No. 473,035

16 Claims. (Cl. 49—1)

1

The present invention relates generally to machinery and more particularly to a glass working machine for building up composite articles of glass or other materials.

In many types of work, for example the manufacture of radio tubes, it is necessary to build up composite articles. In some cases, it may be desirable to fuse a plurality of glass articles of different sizes onto another article of glass, metal or other suitable material. In other instances, it may be desirable to make a tube of hard glass at one end and of soft glass at the other. Very hard glass is not readily fusible to soft glass. To obtain best results, it is necessary to go from one extreme to the other gradually, by fusing a series of sections each slightly harder or softer than the preceding section. The examples are given as illustrative without intending to limit the scope of the invention or the extent of its application. Previous devices for these various types of work have been cumbersome in their operation, requiring the parts to be removed and replaced an excessive number of times. Time is lost in the operations and substantial breakage results from handling, from cooling and from reheating the parts. In addition, the percentage of defective articles made on prior devices is excessive due to inaccurate alignment and improper presentation of the parts to be fused together.

The present invention aims to provide a simple machine for expeditiously building up composite articles by accurately presenting a plurality of articles one after another to be secured to another article by fusing. The rapidity with which the parts are assembled, minimizes the reheating necessary and reduces the time and labor required in making the articles; in addition, the glass may be annealed while in the machine.

An object of the present invention is to provide a simple machine for manufacturing composite articles.

Another object of the invention is to provide a simple machine for fusing a series of parts on an article consecutively.

Another object of the invention is to provide simple means for rotating the holders in unison during the fusing operation without interfering with the movement of parts toward and from each other and without interfering with the presentation of additional parts to be fused.

Another object of the invention is to provide an improved holder for gripping and holding the articles.

Another object of the invention is to provide

2 a simple mechanism for operating the work holder to grip and release the work without interfering with the operation of the other parts of the machine.

Another object of the invention is to accurately position the parts presented for fusing to prevent the formation of defective articles.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a fragmentary perspective view of the machine, the legs being broken away;

Fig. 2 is a longitudinal sectional view through the machine illustrating the position and operation of two aligned work holders;

Fig. 3 is a sectional view along the line 3—3 of Fig. 2 illustrating parts of the machine;

Fig. 4 is a sectional view along the line 4—4 of Fig. 2 illustrating the underside of the turret; and Fig. 5 is a sectional view of a glass tube made up of separate sections, differing in hardness, fused together.

Described generally, the preferred embodiment of the invention comprises a frame 1 with a table 12 having rails 2 for supporting the operating mechanism. A turret 4 is mounted on the table to move lengthwise thereof toward and from a work holder 5. The turret has a series of work holders 6 adapted to be moved into alignment with the holder 5, which is frequently referred to herein as stationary for identification, it being understood that a movable mounting therefor, such as that for the burner, is within the contemplation of the invention and within the scope of the claims. Suitable burners 7 are mounted on a carriage 8 likewise movable longitudinally of the table. The burners are intermediate the stationary holder 5 and the turret 4 to direct a flame on the articles being presented by the respective holders. A shaft 9 extends longitudinally over the table through a bearing 10 on the burner carriage 8 and through a bearing 61 on the carriage 3 for the turret. The shaft 9 rotates in unison the stationary holder 5 and the respective holders 6 on the turret presented to the stationary holder. The stationary holder and drive therefor, the turret and its carriage and the burner and its carriage will now be described in detail.

Referring more particularly to Fig. 1, the supporting frame work may comprise suitable legs 11 with the table 12 thereon for supporting the rails 2 on the upper surface thereof. The rails 2 form suitable guides and sliding surfaces for mounting the turret carriage 3 and the burner carriage 8 to permit their movement with respect to the table. A suitable rack 14 on the side of the table cooperates with the gears operated by the hand wheels 15 and 16 for freely moving the two carriages.

Referring more particularly to Figs. 1 and 2, a suitable casting 17 is mounted on the table 12 on the left end of the machine having a bearing 18 on one side and a bearing 19 on the other. The stationary work holder 5 is provided with a reduced portion 21 which extends through and is mounted in the bearings 18 and 19 for rotation about its axis. A suitable pulley 22 is keyed to the reduced portion 21 for rotating the holder 5, which has a plurality of recesses 24 preferably two or more in number adapted to receive holding fingers 25 for gripping an article. The recesses 24 have grooves or guideways 26 to receive the parts 27 of the fingers 25. The grooves are inclined inwardly so that when the fingers 25 are moved toward the left, they expand to release the work and when moved toward the right, they contract to grip the work. Suitable notches 28 may be provided in the fingers for receiving and holding the work.

For the purpose of operating conveniently the fingers 25 to grip and release the work, there is provided a hollow member 30 extending centrally through the cylindrical interior of the work holder 5. One end of the member 30 has a flange 31 which fits into notches 32 in the holding fingers 25. The other end of the member 30 has a collar 34 thereon operatively connected to a bell crank 35 pivoted at 36 with its opposite end 37 conveniently located for manipulating the collar and the member 30. A suitable spring 38 retains the bell crank 35 in its ineffective position. A suitable set screw 39 may be located under the part 37 of the bell crank for limiting the distance which the collar 34 and the member 30 are moved. The hollow member 30 operatively connected to the fingers 25 has a shoulder 41 thereon facing a shoulder 44 on the part 19 with a spring 42 effective upon the shoulders for resiliently retaining the member 30 pressed toward the right; that is to retain the holding fingers in closed position. A second hollow member 45 extends through the hollow member 30 for the purpose of pressing the work 46 outwardly. The member 45 is resiliently retained in its outer position by a spring 47 intermediate shoulder 48 on the member 45 and a shoulder 49 on the interior of the member 30. The longitudinal movement of both of the members 30 and 45 are limited by a set screw 50 projecting into slots 51 therein.

In the operation of the stationary holder 5 for receiving and holding the work 46, the handle 37 of the bell crank 35 is pressed down, which moves the collar 34 and the member 30 to the left (Fig. 2). The flange 31, on the right end of the member 30, fitting in the slots 32 of the holding members 25, slides the holding members along the guideways 26 in the recesses 24 thereby expanding the holders to release a part and to permit another part to be placed in the holder. The inner member 45, which engages the end of a part to hold it in position in the holder, is resiliently retained in its outer position by the spring 47 and limited in its outer movement by the set screw 50, operating in slot 51 thereof. After a part 46 has been removed and another replaced, the handle 37 is released permitting the spring 42 to resiliently urge the member 30 to the right carrying with it the holding members 25 which grip the article 46. Since both the hollow members 30 and 45 are held in position by springs 42 and 47 respectively, the work is resiliently mounted and may accommodate itself to pressures applied to it. A suitable flexible conduit 54 may be attached to the end of the inner hollow member 45 as shown at 55 for supplying air for preventing the work from collapsing or for expanding the heated glass.

In order to obtain uniform fusing, as will be described hereinafter, it is desirable that the work holders be rotated during the assembling and fusing operation at the same speed about a common axis. The pulley 22 keyed to the member 30 is provided for this purpose and may be driven in any suitable manner, preferably by a motor through suitable reduction gears 56 (Fig. 1). A gear 57, keyed to the reduced portion 21 and to the pulley 22, meshes with another gear 58 on the end of shaft 9. The shaft 9 extends longitudinally of the table and has a second gear 59 for driving the holders 6 on the turret which are presented to the stationary holder 5 as will be described hereinafter. The shaft 9 is mounted in a bearing 60 at one end and extends through bearing 10 on the burner carriage and through bearing 61 on the turret carriage with its outer end supported in a bearing at 62. A suitable covering 64 attached to the turret serves as a shield and cover for the exposed end thereof. The gear 59 with its attached bearing sleeves slides along the shaft 9 as the turret carriage is moved toward and away from the holder 5. A key 63 causes the gear 59 to rotate with the shaft and at the same time permits longitudinal movement of the gear along the shaft.

The turret carriage 3 (Figs. 1 and 2) rests on the rails 2 of the table 12 to slide freely along them. The hand wheel 15 has a shaft 65 in a bearing on the carriage with a gear thereon meshing with a gear 67 on stub shaft 68 which carries a gear 69 meshing with rack 14. Rotation of the wheel 15 by the handle 70 causes the carriage 3 with the turret thereon to move toward and away from the holder 5. A vertical shaft 75 extends upwardly from the turret and passes through the hollow part 76 of the turret to hold it in position. A suitable sleeve 77 intermediate the casing and the vertical shaft with a flange 78 at its lower end provides a bearing to minimize wear and to facilitate rotation of the turret. The sleeve flange 78 rests on ball bearings 79 on the bearing 80 supported by the carriage. Thus the turret is rotatably mounted through the ball bearings 79 on the carriage.

The turret has a series of work holders 6 constructed similarly to the parts of the holder 5, which will be described briefly as a detailed description of the parts may be had by referring to the description above of the holder 5. The work gripping fingers 25' move in inclined slots 26' in the sides of recesses 24'. A central member 30' engages the fingers 25' at one end through a flange 31' and has a collar 34' attached to its other end. The bell crank 35' is pivoted at 36' with a handle 37'. By pressing down the handle 37', the collar 34' and member 30' are forced to the right, moving the fingers 25' outwardly along the inclined slots to release a work part or to permit a work part to be inserted. When the handle 37' is released, the spring 42' returns the member 30' and the fingers 25' to their normal gripping position. A suitable set screw 39' limits the distance that the handle 37' may be moved downwardly to release the fingers. A member 45' held in its extended position by a spring 47' extends centrally through the member 30' to engage and force outwardly the work held in the finger 25'.

By rotating the turret by the handles 81 any one of the holders 6 may be aligned with the stationary holder 5. Thereafter, by turning the wheel 15 by the handle 70, the carriage and turret may be moved toward the stationary holder so that the two parts are juxtaposed for fusing purposes.

In order to stop the turret with the holder 6 aligned with the stationary holder, a series of recesses 82 (Figs. 2 and 4) are provided in the undersurface thereof. A locking pin 84 is mounted in a socket 85 of the carriage and held in its upper position by a spring 86. The pin 84 has a bolt 87 extending through it with the ends thereof in slots 88 of socket 85. The bolt 87 is connected at one end by means of a link 89 to a handle 90. By pressing the handle down, the pin 84 is removed from the socket 82 so that the turret may be rotated as desired. When the handle 90 is released, the pin 84 engages the bottom of the turret and is forced by spring 86 into the first recess 82 which becomes aligned with it. Thus the pin 84 locks the turret in position with one of the turret holders 6 in alignment with the stationary holder 5. The work parts in the holders are thus accurately positioned for the fusing operation. The gear 59 on the longitudinally extending shaft 9 meshes with the gear 57' on a turret holder 6 for rotating the aligned holder in unison with the stationary holder. As the turret is rotated, successive gears 57' are moved into meshing relation with the gear 59. In this way, each of the holders will be rotated immediately upon being aligned with the stationary holder at the same speed that the stationary holder is rotated.

The carriage 8 for supporting the burners 7 and 7' is similar to the carriage 3 for supporting the turret. The carriage 8 slides along the rails or runways 2 and is held in position thereon by members 91. The hand wheel 16 has a gear 66' on its shaft 65', which meshes with gear 67' on shaft 68'. Gear 69' on shaft 68' meshes with the rack 14 so that rotation of the hand wheel 16 will move the burner carriage 8 in either direction. Gas is supplied to the burners 7 and 7' by a pipe 94 having branches 94' and 94'' leading through the valves 95' and 95''. Suitable hose connections 96' and 96'' adapted to permit movement of the carriage without disturbing the gas connections connect the pipes 94' and 94'' with pipes 97' and 97'', leading to the burners. Thus by rotating the hand wheel 16, the carriage and the burners thereon may be moved longitudinally of the table to and from the stationary holder 5 and to and from the turret 4 without interfering with the gas connections. Suitable treadles (not shown) may be connected to the rods or chains 98' and 98'' for opening and closing valves which turn the burners on and off. The valves 95' and 95'' are for regulating the amount of gas delivered.

In the operation of the machine, a suitable part 46, which is to be fused to another part, is inserted in the stationary holder 5 by pressing down on the handle 37 to open the gripping fingers 25. Thereafter the handle is released, and the member 30 under the pressure of the spring 42 causes the fingers to grip the article in position. Other parts to be fused or secured to the part 46 are each mounted in consecutive holders 6 of the turret 4 by pressing down on the handle 37' to open the gripping members 25' and by releasing the handle to permit the part to be gripped. In most instances, a series of parts are to be assembled with the part 46, in which cases the parts are mounted in the respective holders 6 on the turret in their order of assembly. The first element may be mounted just before starting the operation and other elements may be mounted in other turret holders while the first operation is being performed. The turret holder containing the part which is first to be assembled is aligned with the stationary holder 5, by rotating the turret, which will be stopped in its aligned position by the pin 84 being forced into socket 82 by the spring 86. Thereafter the turret is moved toward the stationary holder by rotating hand wheel 15 until the two parts to be secured together are juxtaposed. Both the holders 5 and 6 will be rotated by the drive 56 operating through the pulley 22, gears 57 and 58, shaft 9 and gears 59 and 57'. The parts will be resiliently retained in contact by springs 47 and 47'. Normally the carriage and the burners will be in position to direct a flame on the contacting parts to be joined together. If the burners 7 and 7' should not be in proper position, the burner carriage can be moved independently of the work holders by rotating hand wheel 16 controlling the position of the burner carriage. The operator, by pressing suitable treadles (not shown), moves the rods or chains 98' and 98'' to supply gas to the burners 7 and 7' in sufficient volume to apply the necessary heat for fusing the parts together. Sufficient gas is supplied to the burners independently of the rods 98 and 98' to provide a pilot flame. After the first fusing operation is completed, the handle 37' on the turret may be operated to release the part on the turret holder 6. Thereafter the turret may be rotated, by pressing down the handle 90 to release the locking pin 84, to position a second holder in alignment with the stationary holder. The second part can then be fused either to the first part or to any other portion of the article by repeating the cycle. This can be done quickly if desired before the parts cool and the exact alignment of the parts will be assured because the part 46 has not been removed from the holder. Thus an article may be built up by securing one part after another to it in a minimum time without unnecessary handling. The parts are securely fixed in position so that the alignment of the successive parts is accurate, thereby minimizing defects in the finished articles. While the holders are generally described herein as work holders, it will be understood that they may be utilized to hold tools.

In some cases, for example in making glass tubes of hard glass at one end and soft glass at the other, it is necessary to build the tube up section by section. An illustration is given of such an operation in Fig. 5. The tube is made up of a series of sections 100, the ends of the several sections being indicated by dot-dash lines. The sections at one end are made of hard glass and the sections at the other end are made of soft glass, the intermediate sections have a graduated degree of hardness from the minimum at one end to the maximum at the other end. Such a tube can be built up very readily in the present machine by rotating the turret moving it back slightly in each instance to apply one section after another to the tube. This example is not intended to limit the scope and use of the machine, but is merely given for illustrative purposes.

It will be seen that the present invention provides a machine which is simple in construction and operation and which may be used to build up or assemble parts accurately and efficiently. The holders are effective in gripping and holding the parts and the turret is effective in aligning the turret holders with the stationary holder so that the parts to be added are accurately positioned by mechanical means. The speed of assembly is greatly increased and the accuracy with which the parts will be secured is improved. The elements of the machine are compactly assembled so that they may be readily operated with minimum effort on the part of the operator. The machine is rugged in construction and fully capable of withstanding the rough usage to which it may be subjected.

As various changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described my invention, I claim:

1. In a device of the class described, the combination of a rotatable holder adapted to retain an article adapted to be fused, a gear operatively connected with said holder to rotate with the same, a turret having a plurality of holders rotatably monuted thereon, a gear for each of said turret holders for rotating the same, and a shaft having a gear meshing with the gear on said first mentioned holder and having another gear selectively meshing with a gear on a turret holder for driving one of the turret holders in unison with the first mentioned holder, and at the same speed, gas jets for fusing articles held in the holders to unite them, said turret being rotatable to present its holders carrying fusible articles to said first mentioned holder and simultaneously to bring a drive gear of each of the turret holders into mesh with said other gear on said shaft.

2. In a device of the class described, the combination of a rotary holder, a rotatable turret having a plurality of holders thereon adapted to be presented consecutively to said first mentioned holder by rotation of the turret, a burner intermediate said first mentioned holder and said turret adapted to apply a flame to fusible articles held by said holders, said burner being movable toward and away from said turret, said turret being movable toward and away from said burner and toward and away from said first mentioned holder, and means including a shaft extending beneath said turret and said first mentioned holder for rotating the first mentioned holder and each holder presented thereto in unison at the same speed.

3. In a device of the class described, a work holder comprising, in combination, a plurality of members adapted to grip a piece of work, a tubular member adapted to operate said gripping members, a second tubular member within said first tubular member adapted to engage the end of a piece of work, means for resiliently urging said second tubular member longitudinally of said first tubular member to apply pressure to the work and means for resiliently urging said first tubular member in a direction to close said gripping members.

4. In a device of the class described, a work holder comprising, in combination, a plurality of gripping members, a member having inclined channels for mounting said gripping members, a tubular member for moving said gripping members along said channels to open and close the same, a second tubular member within said first tubular member, and resilient means for urging said second tubular member longitudinally with respect to said first tubular member to apply pressure to the work.

5. In a device of the class described, a work holder comprising, in combination, a rotatable member having slots with guideways inclined to the axis thereof, a plurality of gripping elements mounted in said slots and movable along said guideways, a tubular member extending centrally of said rotatable member and engaging said gripping members to open and close the same by moving them along said guideways, a second tubular member within said first tubular member for engaging the end of a piece of work and for cooperating with said gripping members in positioning said piece of work.

6. In a device of the class described, a work holder, comprising, in combination, a rotary member having a plurality of slots therein, with surfaces inclined to the axis of the rotary member, a plurality of gripping members in said rotary member adapted to move along said inclined surfaces to open and closed positions, a tubular member having a flange thereon engaging said gripping member to open and close the same, a second tubular member within said first tubular member adapted to engage the end of a piece of work and to cooperate with said gripping members in positioning said piece of work, means for retracting said first tubular member to open said gripping members, and resilient means for retaining the second tubular member in engagement with the end of the work.

7. In a device of the class described, in combination, a work holder comprising a plurality of members adapted to grip a piece of glass to be fused, a tubular member adapted to operate said gripping members, a second tubular member within said first tubular member adapted to engage the end of a piece of glass to be fused, means for resiliently urging said second tubular member longitudinally of said first tubular member to apply pressure to the glass to be fused to cause the pieces to unite, means for resiliently urging said first tubular member in a direction to close said gripping members, a second work holder of like construction aligned with said first holder and means for rotating each of said holders in unison at the same speed.

8. In a device of the class described, in combination, a work holder comprising a plurality of members adapted to grip a piece of glass to be fused, a tubular member adapted to operate said gripping members, a second tubular member within said first tubular member adapted to engage the end of a piece of glass to be fused, means for resiliently urging said second tubular member longitudinally of said first tubular member to apply pressure to the glass to be fused to cause the pieces to unite, means for resiliently urging said first tubular member in a direction to close said gripping members, a second holder of like construction, means for moving said second holder toward and away from said first holder and means for rotating said holders in unison at the same speed.

9. In a device of the class described, the combination of a first holder having a rotary member with slots therein, gripping members within said slots, a tubular member for opening and closing said gripping members, and a second member for engaging the end of a piece of work held by said gripping members, a turret having a plurality of holders of like construction thereon, said turret being rotatable for aligning the holders thereon with respect to the first holder, a shaft, and means for operatively connecting said shaft to the first holder and to a holder on the turret aligned therewith for rotating the two in unison.

10. In a device of the class described, the combination of a first holder, a plurality of gripping members thereon, a tubular member extending centrally of said first holder to operate said gripping members, a turret having a plurality of holders thereon, each of said turret holders having a plurality of gripping members thereon, a tubular member extending centrally of each of said turret holders for operating the gripping members of the turret holders, each of said holders having a gear mounted thereon for rotating said holders and a shaft having a gear thereon for engaging the gear on said first holder, and having a gear thereon for engaging a gear on the turret holder aligned with the first holder for rotating the two aligned holders in unison.

11. In a device of the class described, the combination of a first holder, a plurality of gripping members thereon, means extending centrally of said first holder to operate said gripping members, a tubular member extending centrally of said means for cooperating with said gripping members to retain work in position therein, a turret having a plurality of holders thereon, each of said turret holders having a plurality of gripping members thereon, means extending centrally of said turret holders for operating the gripping members thereof, a member extending centrally of each of said second mentioned means for engaging the end of a piece of work and for cooperating with the gripping members to hold it in position, each of said holders having a gear mounted thereon for rotating said gripping members, and a shaft having a gear thereon for engaging the gear on said first holder and a gear thereon for engaging the gear on an aligned turret holder for rotating the two aligned holders in unison.

12. In a device of the class described, the combination of a first holder, a plurality of gripping members thereon, means extending centrally of said first holder to operate said gripping members, and a tubular member extending centrally of said means for cooperating with said gripping members to retain work in position therein, a turret having a plurality of holders thereon, each of said turret holders having a plurality of gripping members thereon, means extending centrally of said turret holders for operating the gripping members thereof, a member extending centrally of each of said second means for engaging the end of a piece of work and for cooperating with the gripping members in holding it in position, each of said holders having a gear mounted thereon for rotating said gripping members, and a shaft having a gear thereon for engaging the gear on said first holder and a second gear thereon for engaging the gear on the aligned turret holder for rotating the two aligned holders in unison, said turret being movable toward and away from said first holder without disturbing the driving connection between the aligned holders.

13. In a device of the class described, the combination of a first member, a plurality of gripping members mounted thereon, means extending centrally of said gripping members to operate said gripping members, a turret having a plurality of holders thereon selectively alignable with the gripping members mounted on said first member, each of said turret holders having a plurality of gripping members thereon, means for rotating said gripping members of said first member and of the turret holder aligned therewith, and resiliently mounted means extending centrally of said turret holders for operating the gripping members of the turret holders.

14. In a device of the class described, the combination of a stationary member having a rotary holder thereon adapted to retain an article, a rotatable member having a plurality of rotatable holders thereon adapted to present articles consecutively to an article in said first mentioned holder, means for rotating the article holder on said stationary member and the presented holder on said rotatable member at the same speed, a burner for directing a flame on the articles to be joined at the zone of juncture to fuse them together as they turn at the same speed, and resiliently mounted means associated with at least one of said holders for resiliently pressing said articles to be joined against each other, said rotatable member being movable toward and away from said stationary member.

15. In a device of the class described, the combination of a member having a rotary holder thereon adapted to retain an article, a rotatable member having a plurality of rotatable holders thereon adapted to present articles consecutively to an article in said first mentioned holder, said rotary holder on said first mentioned member having a centrally extending resiliently mounted tube for urging the article held in the holder outwardly, a conduit connected to said tube for supplying air thereto, and a burner for directing a flame on the articles to be joined at the zone of juncture to fuse them together as they turn at the same speed, said members being relatively movable toward and away from each other.

16. In a device of the class described, the combination of a rotary holder having a resiliently mounted member therein for pressing outwardly an article being held by the holder, a turret having a plurality of rotary holders thereon adapted to be presented consecutively to said first mentioned holder, means for rotating said first mentioned rotary holder and the holder presented to it at the same speed, said resiliently mounted member pressing said articles together, a burner intermediate said first mentioned holder and said turret to apply a flame to fusible articles held by said holders to fuse them together, said burner being movable toward and away from each of said holders, and a handle for rotating the turret to successively present articles positioned in its holders to an article positioned in the first holder, said turret and said first mentioned holder being relatively movable toward and away from each other.

LOUIS C. KAHLE.

REFERENCES CITED

The following references are of record in the file of this patent:

UNITED STATES PATENTS

| Number | Name | Date |
|---|---|---|
| 370,604 | Cahill | Aug. 27, 1887 |
| 740,641 | Glover | Oct. 6, 1903 |
| 1,446,026 | Wetmore | Feb. 20, 1923 |
| 1,458,359 | Riley | June 12, 1923 |
| 1,576,221 | Rippl | Mar. 9, 1926 |
| 1,676,795 | Mailey et al. | July 10, 1928 |
| 1,721,570 | Millar | July 23, 1929 |
| 1,734,904 | Hollnagel | Nov. 5, 1929 |
| 1,879,656 | Brown | Sept. 27, 1932 |
| 1,897,640 | Millar | Feb. 14, 1933 |
| 1,912,405 | Ronci | June 6, 1933 |
| 2,151,840 | Dichter | Mar. 28, 1939 |
| 2,290,050 | Henkley et al. | July 14, 1942 |
| 2,306,054 | Guyer | Dec. 22, 1942 |

FOREIGN PATENTS

| Number | Country | Date |
|---|---|---|
| 14,496 | Great Britain | 1899 |